UNITED STATES PATENT OFFICE.

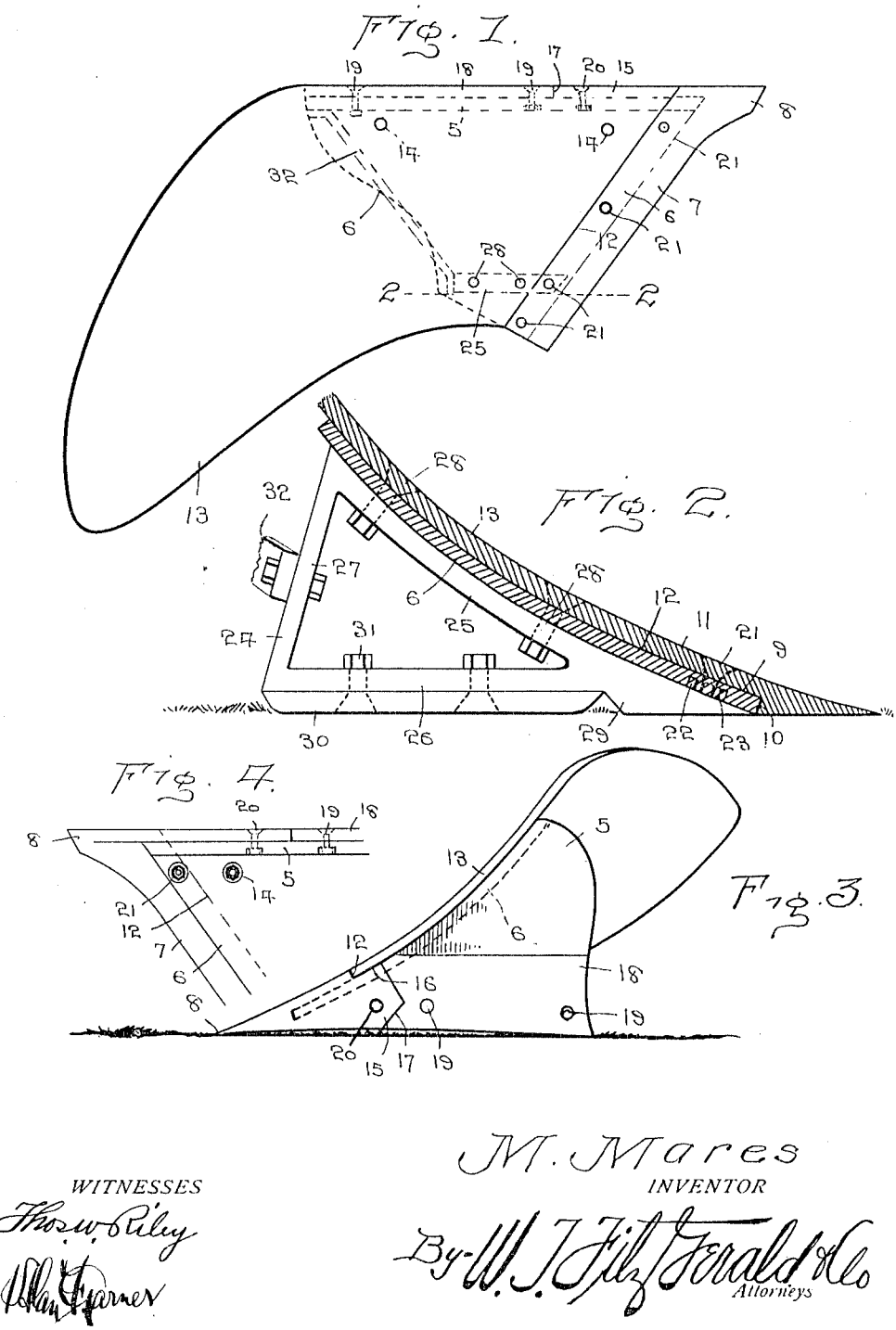

MATT MARES, OF RACINE, WISCONSIN.

PLOW.

1,118,566.  Specification of Letters Patent.  Patented Nov. 24, 1914.

Application filed July 3, 1913.  Serial No. 777,314.

*To all whom it may concern:*

Be it known that I, MATT MARES, a citizen of the United States, residing at 1303 Chestnut street, Racine, in the county of Racine and State of Wisconsin, have invented certain new and useful Improvements in Plows; and I do hereby declare the following to be a full, clear, and exact description of the invention, such as will enable others skilled in the art to which it appertains to make and use the same.

This invention relates to plows, and one of the principal objects thereof is to provide a plow with a runner for supporting the plow at one end thereof, and for counteracting side draft.

Another object of my invention is to provide a plow, having a plow share which may be easily and quickly secured or detached from the frog of the plow.

A still further object is to provide a plow which will be simple, durable, efficient in operation and inexpensive to manufacture.

With these and other objects in view, my invention consists in the construction, combination and arrangement of parts hereinafter more fully described and claimed, and illustrated in the accompanying drawing in which like characters of reference indicate like parts throughout, and in which, Figure 1, is a top plan view of a plow constructed according to my invention. Fig. 2, is a vertical sectional view taken on a line 2—2 of Fig. 1, and drawn upon an exaggerated scale. Fig. 3, is an elevational view looking from the land side of the plow. Fig. 4, is a bottom view of a portion of the plow.

In carrying out my invention I provide a solid frog having a vertical portion 5, and a top portion 6, formed integrally with the vertical portion and set at an angle thereto. The plow share 7, is provided at its inner end with a forward extending point 8, and is in the general shape of a wedge, having its under portion cut away as at 9, forming a shoulder 10, which is adapted to abut against the forward edge of the top portion 6 of the frog. The share 11 extends rearwardly from the shoulder 10, and abuts as at 12, against the front edge of the mold board 13, which is bolted as at 14 to the portion 6 of the frog, the bolt heads being countersunk in the upper surface of the mold board.

Formed integrally with the plow share 7, and adjacent the point 8, is the forward land slide 15, which extends rearwardly from the point 12, and has its upper edge abutting against the mold board as at 16, and has its rear edge 17, substantially wedge shaped to fit against the forward edge of the rear land side 18, which latter is substantially rectangular and is bolted as at 19, to the vertical portion 5 of the frog, the upper front edge of the rear land side 18 being beveled and abutting against the under side of the mold board 13 at the inner edge of the latter. A bolt 20, secures the forward land side 15 to the front end of the vertical portion 5 of the frog, and the heads of the bolt 20 and bolts 19 are countersunk in the land side portions 15 and 18 respectively. A plurality of bolts 21, secure the plow share to the upper portion 6 of the frog, and the latter is rimmed out as at 22, to form a recess for receiving the nuts 23 of the bolts 21. The vertical portion 5, of the frog is also rimmed out where the bolts 19 and 20 extend therethrough.

Near the outer portion of the plow is situated a substantially triangular runner brace 24, comprising an upper curved side 25, a lower straight side 26, and a rear side 27, the latter connecting the rear ends of the sides 25 and 26. The side 25 is secured on the under face of the top portion 6, of the frog by means of bolts 28, which extend through the mold board, frog, and the side 25 of the triangular brace 24. As is shown, the brace 24, at the forward end thereof, is provided with an offset portion 29, which has its upper face merging with the upper face of the side 25, and which has its under face situated below the plane of the side 26 and parallel therewith. Rearwardly of the offset portion 29, is situated a runner 30, which has its under face in the same plane with the under face of the offset 29, and which is secured to the side 26, of the brace, by means of bolts 31, the latter having their heads countersunk in the runner 30. A brace rod 32 extends from the side 27 of the brace across to the vertical portion 5, of the frog, and is secured to that portion at the rear end thereof, and serves to brace the runner.

When the plow is in use, the runner 30 is adapted to bear against the ground and to guide the plow forwardly, and as is obvious, the runner will bite into the ground and thus counteract the side draft commonly occurring in plows of this nature. If it is so desired, a pair of braces and runners may be secured to the plow in a manner similar to the manner described.

It will be noticed that the under edge of the landside and of the vertical portion 5 of the frog is slightly concaved longitudinally, the under face of the plow share and edge of the portion 6, of the frog, being concaved to conform with the concavity of the landside, so as to give the proper pitch to the plow share and point.

Although I have described the preferred embodiment of my invention, I reserve and may exercise the right to make such changes in the construction, combination and arrangement of parts as do not depart from the spirit of the invention, and the scope of the appended claim.

Having thus fully described my invention, what I claim as new and desire to secure by Letters-Patent, is;

A plow of the class described, providing a plow frog, a plow share secured thereto, a mold board secured thereto, a brace secured thereto, said brace comprising an upper side, a lower side, and a rear side, and having its forward portion extended and offset, and a runner secured to the lower side rearwardly of the offset portion.

In testimony whereof I have signed my name to this specification in the presence of two subscribing witnesses.

MATT MARES.

Witnesses:
P. R. SPENCER,
ALBERTA SPENCER.

Copies of this patent may be obtained for five cents each, by addressing the "Commissioner of Patents. Washington, D. C."